(12) United States Patent
Sylvester et al.

(10) Patent No.: US 11,677,222 B1
(45) Date of Patent: Jun. 13, 2023

(54) WINGED CABLE MOUNT

(71) Applicant: Panduit Corp., Tinley Park, IL (US)

(72) Inventors: David J. Sylvester, Manhattan, IL (US); Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/563,483

(22) Filed: Dec. 28, 2021

(51) Int. Cl.
*H02G 3/04* (2006.01)
*F16L 3/10* (2006.01)

(52) U.S. Cl.
CPC .......... *H02G 3/0456* (2013.01); *F16L 3/1058* (2013.01)

(58) Field of Classification Search
CPC .............................. H02G 3/0456; F16L 3/1058
USPC ........................ 248/68.1, 74.3, 65, 74.1, 74.2
See application file for complete search history.

(56) References Cited

U.S. PATENT DOCUMENTS

| | | | |
|---|---|---|---|
| 4,379,537 A * | 4/1983 | Perrault | F16L 3/1058 411/437 |
| 4,805,856 A | 2/1989 | Nicoli et al. | |
| D347,782 S | 6/1994 | Wentzel | |
| 5,332,179 A | 7/1994 | Kuffel et al. | |
| 5,368,261 A * | 11/1994 | Caveney | F16L 3/233 248/69 |
| D399,414 S | 10/1998 | Viklund | |
| 6,076,781 A | 6/2000 | Kraus | |
| 6,105,908 A * | 8/2000 | Kraus | F16L 3/233 248/74.3 |
| 6,394,399 B2 | 5/2002 | Koziol | |
| 7,503,528 B2 | 3/2009 | Adams et al. | |
| 7,861,981 B2 * | 1/2011 | Olver | H02G 3/32 248/65 |
| 7,913,957 B2 | 3/2011 | Nelson et al. | |
| 8,991,774 B2 | 3/2015 | Hajduch | |
| 10,001,226 B2 | 6/2018 | Haynes et al. | |
| 10,148,075 B2 | 12/2018 | Loewe et al. | |
| 10,399,516 B2 | 9/2019 | Chapman | |
| 10,473,240 B2 * | 11/2019 | Erkelens | B64C 1/406 |
| 10,527,200 B2 | 1/2020 | Haynes et al. | |
| 11,142,381 B1 * | 10/2021 | Geiger | F16L 3/137 |
| 2016/0009469 A1 * | 1/2016 | Schneider De Oliveira | B65D 63/1027 248/74.3 |
| 2020/0185899 A1 * | 6/2020 | Leng | F16L 3/13 |

OTHER PUBLICATIONS

Cradle Clip manufactured by Hellermann Tyton; date unknown; 1 page.
Mounting Cradle manufactured by Hellermann Tyton; 2020; 1 page.

* cited by examiner

*Primary Examiner* — Muhammad Ijaz
(74) *Attorney, Agent, or Firm* — Christopher S. Clancy; James H. Williams; Aimee E. McVady (57) ABSTRACT

A winged cable mount that secures a cable or a cable bundle positioned on the mount. The winged cable mount includes a round base and side supports extending from the base. Each side support includes a main member and a tab positioned at a distal end of the main member. The side supports wrap around the cable or cable bundle positioned on the mount. The round base includes aligned slots positioned opposite each other for receiving a cable tie to secure the cable or cable bundle positioned on the mount.

6 Claims, 9 Drawing Sheets

WINGED CABLE MOUNT

FIELD OF THE INVENTION

The present invention relates to a cable mount, and more particularly to a heavy-duty winged cable mount for securing cable bundles.

BACKGROUND OF THE INVENTION

Figure 1:
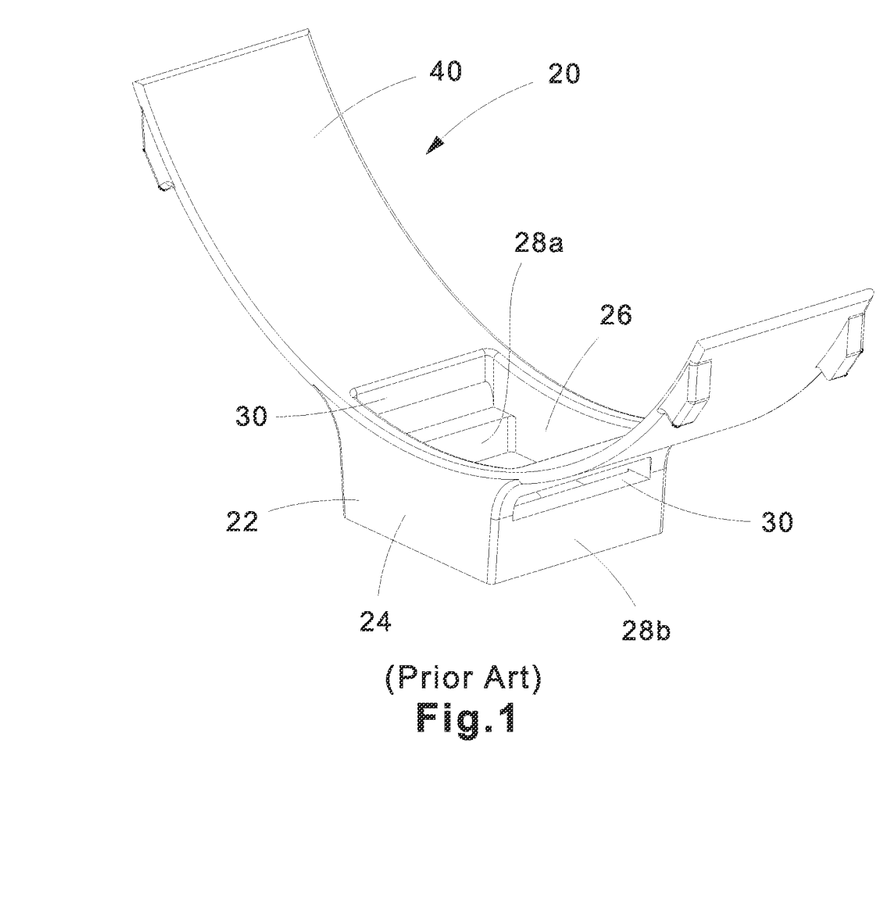
FIG. 1 is a perspective view of a prior art cable mount for securing cable bundles.
Figure 2:
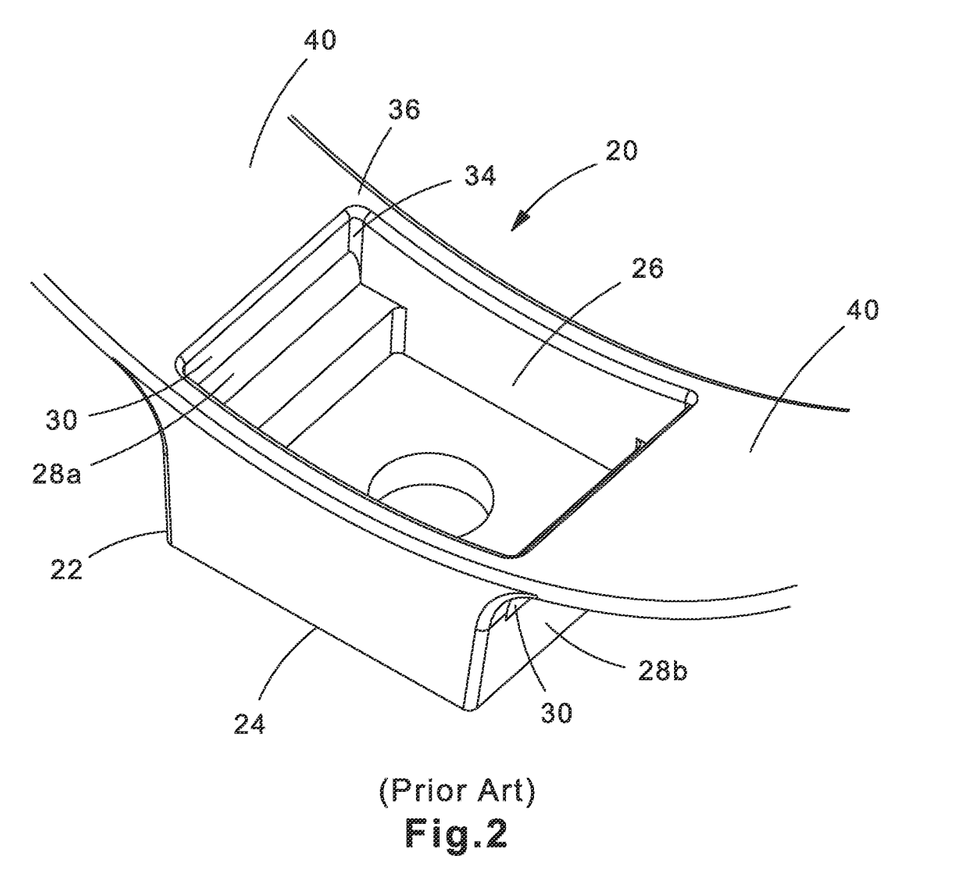
FIG. 2 is a perspective view of the base of the prior art cable mount of FIG. 1.
Figure 6:
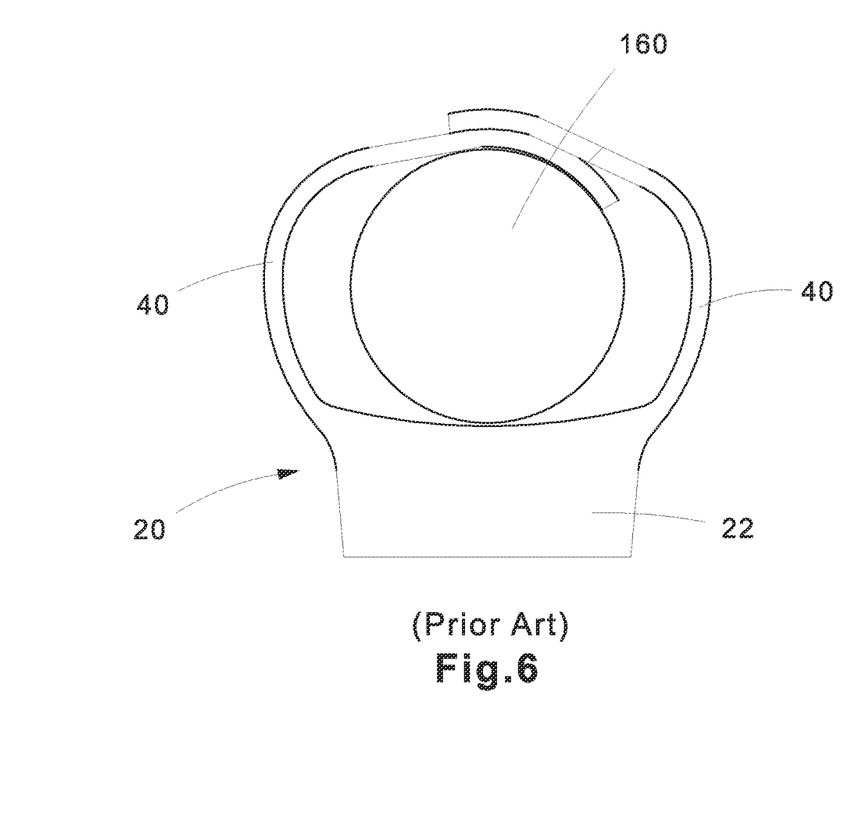
FIG. 6 is a side view of the prior art cable mount of FIG. 1 with the sides wrapped around a cable.

FIGS. 1, 2, and 6 illustrate a prior art cable mount 20 used to secure cables. The cable mount 20 includes a rectangular base 22 and side supports or wings 40. The rectangular base 22 has a front 24, a back 26, and two sides 28a, 28b. Each side 28a, 28b includes a slot 30 for receiving a cable tie or strap. A side support 40 extends from each side 28a, 28b of the base 22.

The rectangular base 22 fails to enable an end user to properly secure a bundle of cables, especially a smaller bundle of cables. As illustrated in FIG. 2, the rectangular core out in the base 22 creates a sharp corner 34 and a thin cross-section 36 where each side support 40 attaches to the base 22. These two conditions create a high stress area that develops when the side supports 40 and a cable tie are cinched around a small bundle of cables which ultimately causes the mount to crack. As a result, the side supports 40 tend to break off from the rectangular base 22.

Thus, it is desirable to provide a mount for cable bundling that does not develop cracks once a cable tie is cinched around a cable or a cable bundle on the mount. It is also desirable to provide a mount for cable bundling that provides range taking features to accommodate various sized cables or cable bundles.

SUMMARY OF THE INVENTION

The present invention is directed to a winged cable mount. The cable mount includes a round base with side supports extending from the base. The round base has aligned slots positioned opposite each other for receiving a cable tie to secure the cable or bundle of cables position on the mount. The side supports include a main member and a tab positioned at the distal end of the main member. The side supports wrap around the cable positioned on the mount to provide additional support around the cable after a cable tie has been installed.

DETAILED DESCRIPTION

FIGS. 3-5 and 7-10 illustrate the winged cable mount 120 of the present invention. The winged cable mount 120 eliminates the high stress points that present opportunity for failure in the prior art mounts. The winged cable mount 120 includes a round base 122 and side supports or wings 140. The round base 122 includes circular cored out sections 124 with a circular mounting hole 126. The circular mounting hole 126 is designed to receive a fastener (not illustrated) to secure the winged cable mount 120 to a surface. The round base 122 includes reinforced members 128 along the outer surface extending from the base 122. The reinforced members 128 are positioned opposite each other. The reinforced members 128 include a rectangular first projection 130 and a second projection 132 with legs 134.

Figure 3:
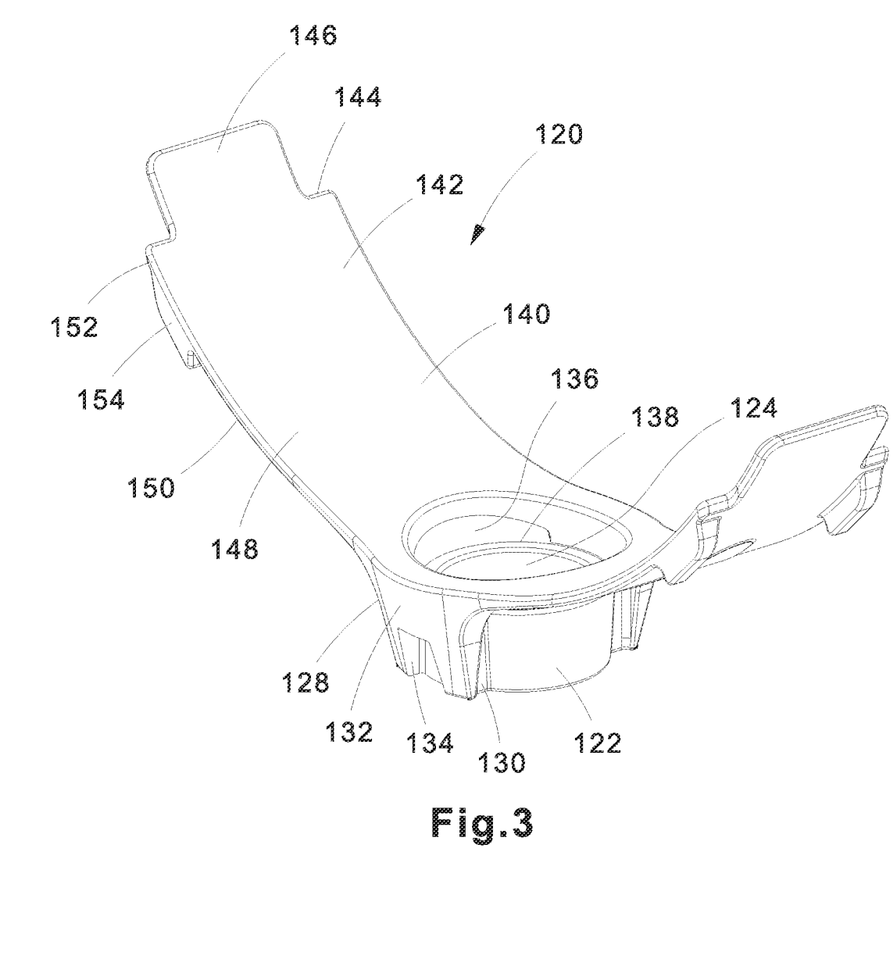
FIG. 3 is a top perspective view of the winged cable mount of the present invention.
Figure 4:
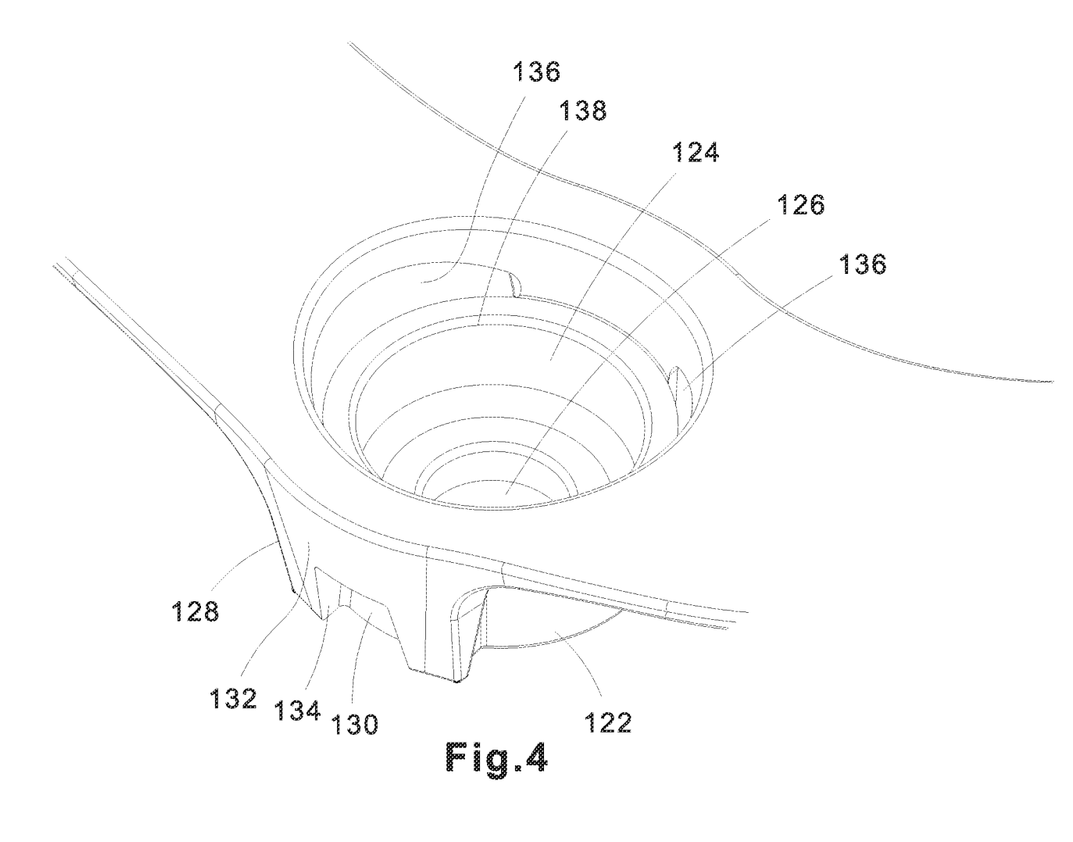
FIG. 4 is a perspective view of the base of the cable mount of FIG. 3.
Figure 5:
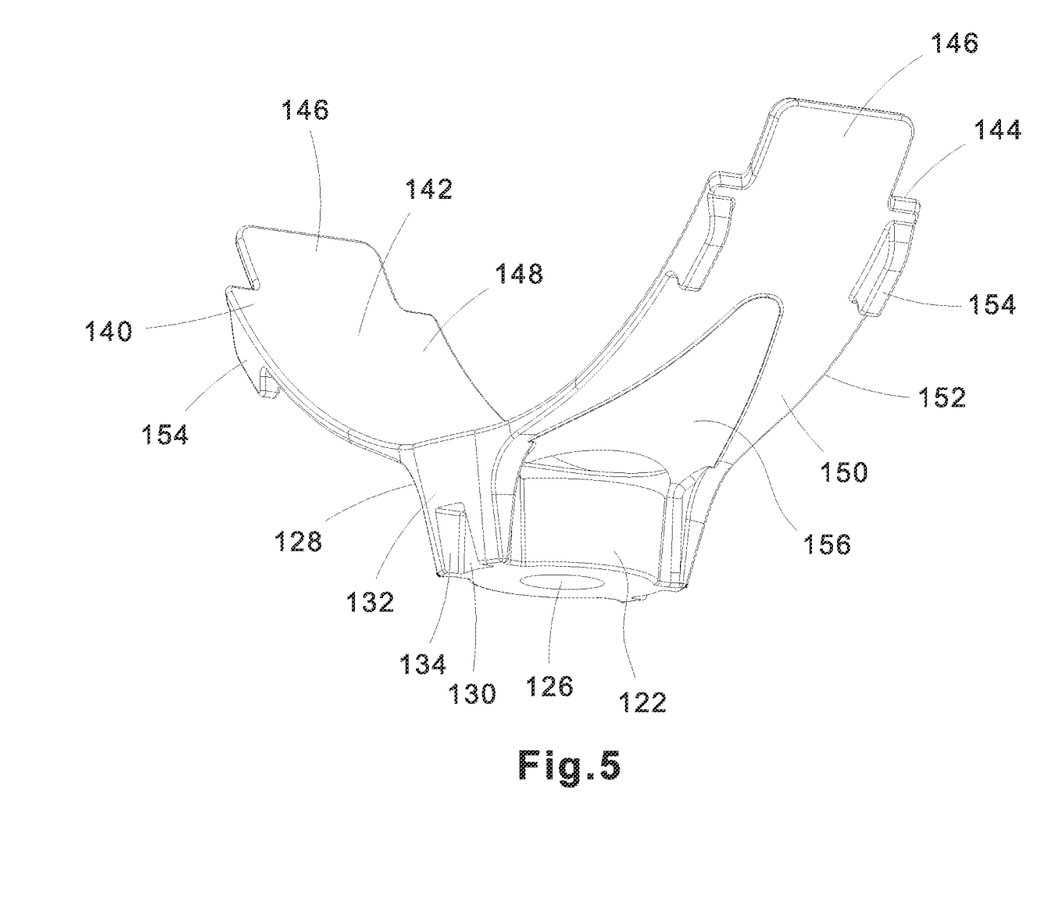
FIG. 5 is a bottom perspective view of the winged cable mount of FIG. 3.

The round base 122 includes two aligned slots 136 positioned opposite each other. The aligned slots 136 define a strap passageway 138 that receives a cable tie or strap to secure a cable or a bundle of cables positioned on the winged cable mount 120.

Side supports or wings 140 extend from the round base 122 in opposite directions. As illustrated in FIGS. 3-4, each side support 140 is located above one of the slots 136 in the base 122. The side supports 140 include a main member 142 and a tab 146 located at the distal end 144 of each main member 142. The tabs 146 have a reduced width with respect to the main member 142 of the side supports 140. As a result, as described below, the tabs 146 are able to overlap enabling the side supports 140 to be wrapped around a small cable or a small bundle of cables.

Each main member 142 includes an inner surface 148 and an outer surface 150. The outer surfaces 150 of the main members 142 include a plurality of alignment pads 154. The alignment pads 154 are positioned along the outer edges 152 of main members 142 of the side supports 140 to maintain a cable tie in position when wrapped around a cable or a bundle of cables positioned on the mount 120.

As illustrated in FIG. 5, each outer surface 150 of the side supports 140 also includes spring members 156 that extend from a first end of the main member 142 of the side support 140 towards the tab 146 at the distal end 144 of the main member 142. Each spring member 156 gradually tapers as it approaches an upper portion of the side support 140. The spring members 156 provide the side supports 140 flexibility to enable the side supports 140 to be wrapped around a cable or bundle of cables positioned on the round base 122 of the cable mount 120.

Figure 7:
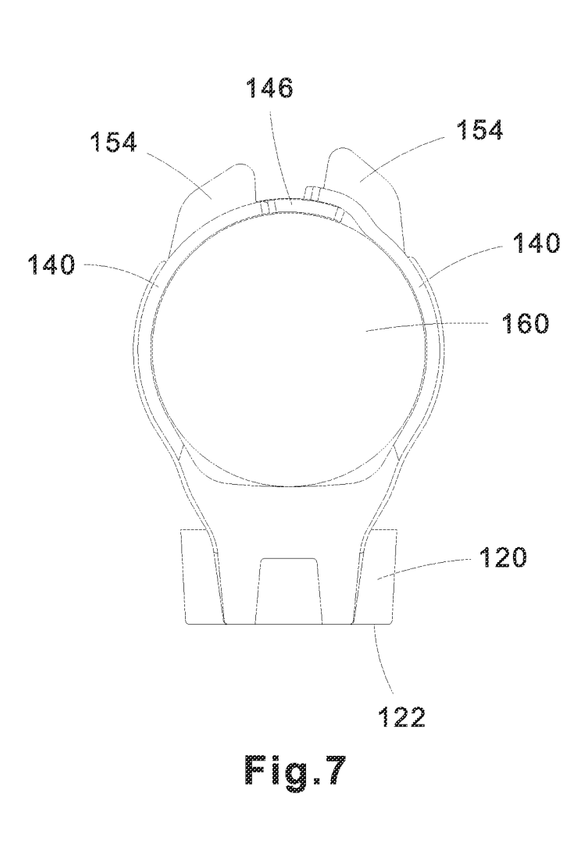
FIG. 7 is a side view of the winged cable mount of FIG. 3 with the flexible side supports wrapped around a cable.

The round base 122 also allows the side supports 140 to be flexible thereby enabling the side supports 140 to wrap around a smaller cable or a small bundle of cables. FIG. 6 is a side view of the prior art cable mount of FIG. 1 with the sides wrapped around a cable. FIG. 7 illustrates a side view of the winged cable mount 120 with the side supports 140 wrapped around a cable 160. The round base 122 has eliminated sharp corners and the thin cross section areas of the prior art. As compared to the prior art mount 20 illustrated in FIG. 6, the flexibility of the side supports 140 enable the side supports 140 to wrap around the cable 160 positioned on the mount 120. The side supports 140 can be cinched around small cables or a bundle of cables without failure. As a result, the end user is able to use this single mount when running cable bundles of different sizes instead of needing multiple mount sizes.

Figure 8:
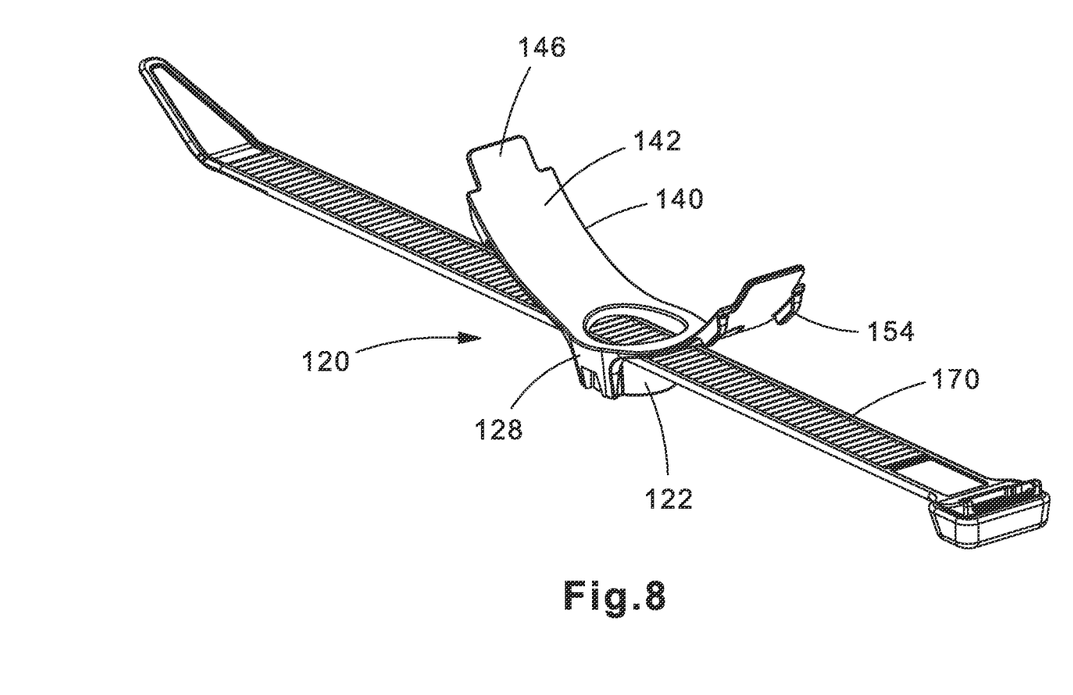
FIG. 8 is a perspective view of the winged cable mount of FIG. 3 with a cable tie installed through the base.

As illustrated in FIG. 8, a cable tie 170 or strap is fed through the aligned slots 136 in the base 122. The mount 120 is designed to enable the cable tie 170 to wrap around the flexible side supports and any cable or bundle of cables positioned on the mount 120. The side supports 140 support the bundle of cables during installation and add extra support around the bundle of cables after the cable tie has been cinched. The alignment pads 154 keep the cable tie in-line with the side supports 140 during installation.

Figure 9:
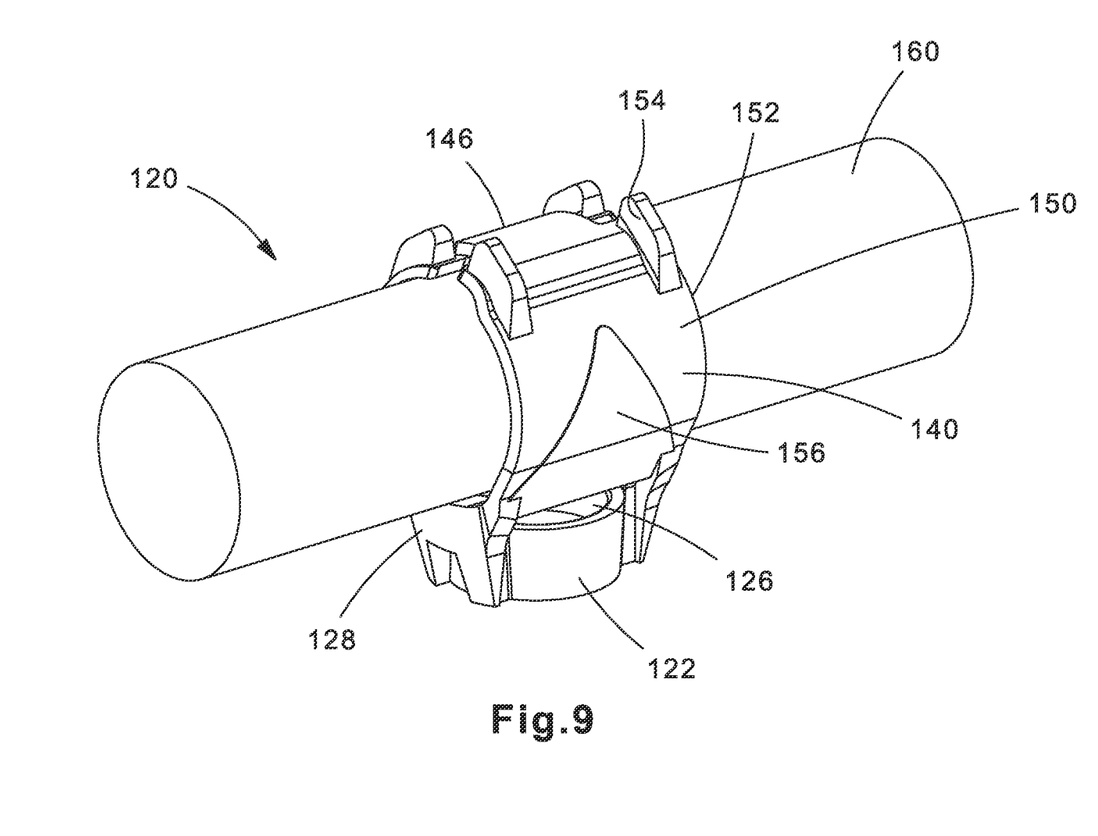
FIG. 9 is a perspective view of the winged cable mount of FIG. 7 with the flexible sides wrapped around a cable.
Figure 10:
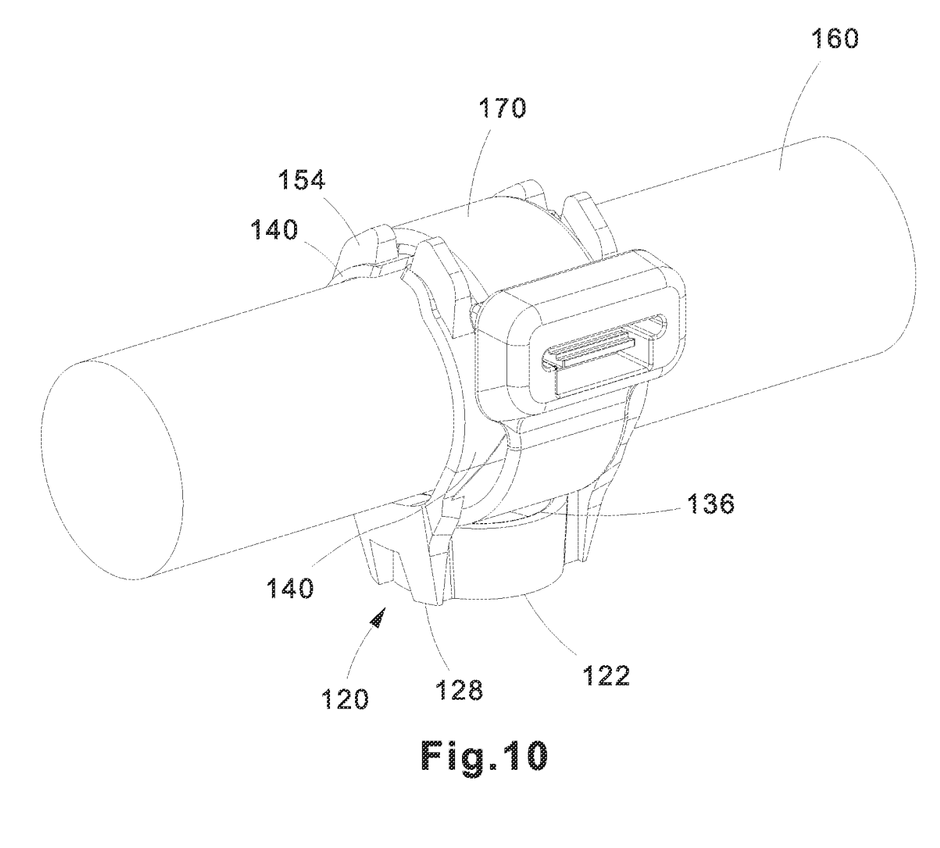
FIG. 10 is a perspective view of the winged cable mount of FIG. 9 with a cable tie wrapped around the flexible sides and the cable.

FIG. 9 illustrates the side supports 140 wrapped around a cable 160 position on the mount 120. As discussed above, the tabs 146 of the side support 140 overlap to accommodate the size of the cable 160 positioned on the mount 120. The over-lapping tabs 146 enable the mount 120 to secure a variety of cable diameters or cable bundle diameters. FIG. 10 illustrates a cable tie 170 fed through the slots and wrapped around the side supports 140 and cable 160 positioned on the mount 120. Once the cable tie 170 is secured, the excess tie may be cut and removed.

The winged cable mount of the present invention provides an improved mount that does not crack when a bundle of cables is installed or when a cable tie is cinched around the mount. The winged cable mount also provides range taking features enabling various sized cables or bundles of cables to be mounted.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A winged cable mount for securing cable positioned on the mount, said mount comprising:
   a round base with aligned slots positioned opposite each other for receiving a cable tie to wrap around the cable positioned on the mount; and
   side supports extending from the round base, wherein each side support includes a main member and a tab positioned at a distal end of the main member, wherein the tab of each side support has a width smaller than a width of the main member of each side support, whereby the tabs overlap when the side supports are wrapped around the cable;
   whereby the side supports are configured to support the cable tie wrapped around the side supports and the cable positioned on the mount.

2. The winged cable mount of claim 1, wherein the main member of each side supports includes alignment pads positioned along outer edges of the main members for maintaining the cable tie in position when wrapped around the cable.

3. The winged cable mount of claim 1, wherein one of the side supports is positioned over one of the aligned slots in the round base.

4. The winged cable mount of claim 1, wherein the round base having a circular cored out section with a circular mounting hole.

5. A winged cable mount for securing cable positioned on the mount, said mount comprising:
   a round base with aligned slots positioned opposite each other for receiving a cable tie to wrap around the cable positioned on the mount; and
   side supports extending from the round base, wherein each side support includes a main member and a tab positioned at a distal end of the main member, wherein each side support includes a spring member extending from a first end of the main member towards the tab;
   whereby the side supports are configured to support the cable tie wrapped around the side supports and the cable positioned on the mount.

6. A winged cable mount for securing cable positioned on the mount, said mount comprising:
   a round base with aligned slots positioned opposite each other for receiving a cable tie to wrap around the cable positioned on the mount, wherein the round base having reinforced members along an outer surface of the round base and extending from the round base, and wherein the reinforced members include a rectangular first projection and a second projection with legs; and
   side supports extending from the base, wherein each side support includes a main member and a tab positioned at a distal end of the main member;
   whereby the side supports are configured to support the cable tie wrapped around the side supports and the cable positioned on the mount.

* * * * *